United States Patent [19]

Arragon et al.

[11] Patent Number: 4,649,419
[45] Date of Patent: Mar. 10, 1987

[54] PSEUDO-RANDOM BINARY SEQUENCY GENERATOR

[75] Inventors: Jean-Pierre Arragon, Roissy; Christian Cantou, Combs-la-Ville; Gérard J. M. Marie, Santeny-Villecresnes, all of France

[73] Assignee: La Radiotechnique, Suresnes (Hauts de Seine), France

[21] Appl. No.: 810,529

[22] Filed: Dec. 17, 1985

Related U.S. Application Data

[63] Continuation of Ser. No. 562,384, Dec. 16, 1983, abandoned.

[30] Foreign Application Priority Data

Dec. 20, 1982 [FR] France ................ 82 21361
Aug. 22, 1983 [FR] France ................ 83 13540

[51] Int. Cl.$^4$ .......................................... H04N 7/167
[52] U.S. Cl. ................................ 380/20; 358/13; 380/21; 380/46
[58] Field of Search ............... 358/13, 114, 119, 122, 358/123

[56]  References Cited

U.S. PATENT DOCUMENTS 4,329,711  5/1982  Cheung ................. 358/114
4,459,611  7/1984  Arai et al. ............. 358/119
4,484,027 11/1984  Lee et al. .............. 358/114

FOREIGN PATENT DOCUMENTS 2431809  1/1983  France .
2533099  3/1984  France .

OTHER PUBLICATIONS

Integrated Fuse Logic, Signetics, May, 1983, pp. 85-90 & 119-121.
On Nonlinear Combinations of Linear Shift Register Sequences, Brüer, Dept. of Elec. Eng., Linkoping University, 3-83.
How to Protect Data with Ciphers that are Really Hard to Break Geffe, Electronics, Jan. 4, 1973, pp. 99-101.
An Analysis of the Structure and Complexity of Non-Linear Binary Sequence Generators, Key, IEEE Trans. on Info Theory, vol. IT22, No. 6, Nov. 1976, pp. 732-736.

Primary Examiner—Michael A. Masinick
Attorney, Agent, or Firm—Thomas A. Briody; Jack Oisher; William J. Streeter

[57]  ABSTRACT

A pseudo-random binary address generator is described which is designed for supplying addresses of cutting points of video signals for the purpose of encoding these signals by rotation of the two segments situated on either side of each cutting point, comprising three feedback registers (A), (B), (C) whose generating polynomials are irreducible and primitive, and in which the numbers of cells are different. These registers comprise several outputs $a_i\, b_j\, c_k$, and the addresses of the cutting points are sums of N terms of weight $2^0$ to $2^{N-1}$ and of coefficients $S_0$ to $S_{N-1}$ of which at least a certain number are deduced from logic equations combining the outputs $a_i\, b_j\, c_k$. At regular intervals a synchronization pulse (SP) reloads in the registers (A), (B), (C) three initial words which, placed end to end, constitute the decoding key, stored in a fourth register (D) with three taps to which, for their reloading, the three registers (A), (B), (C) are momentarily connected.

25 Claims, 8 Drawing Figures

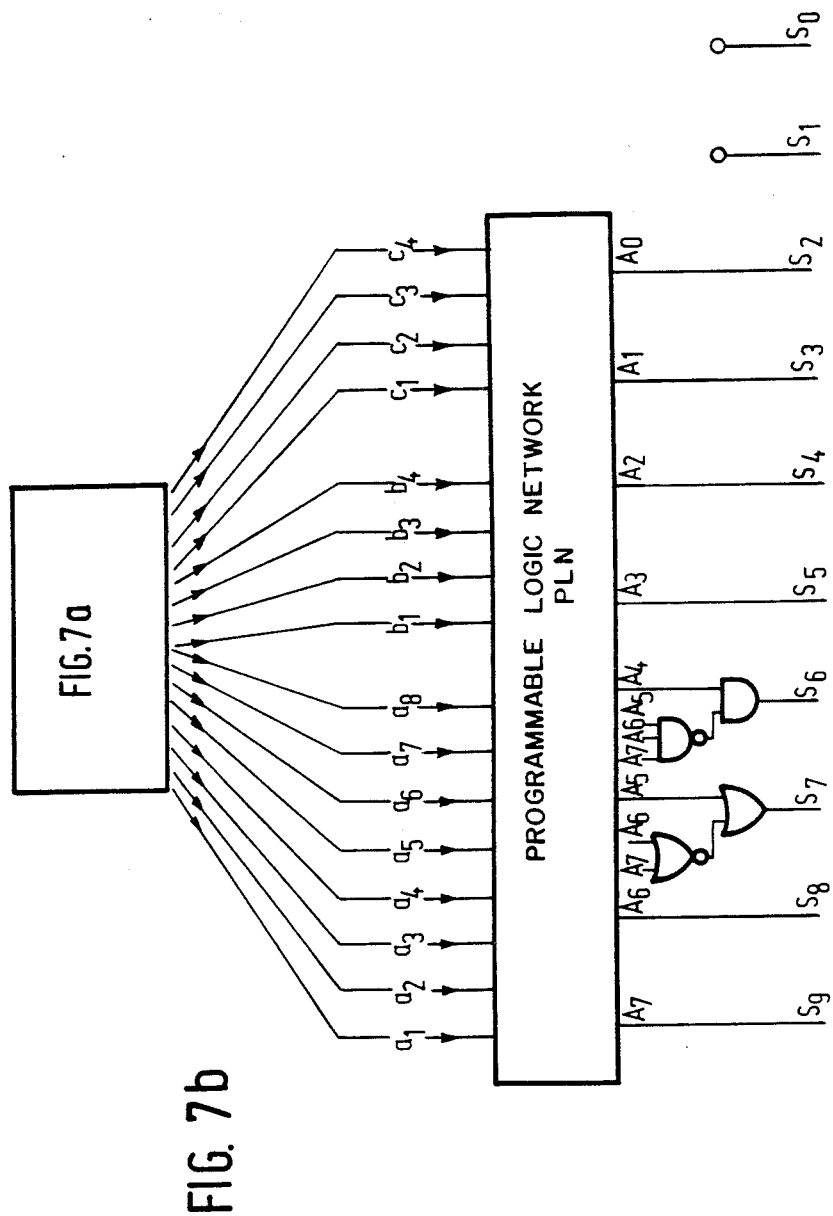

PSEUDO-RANDOM BINARY SEQUENCY GENERATOR

This is a continuation of application Ser. No. 562,384, filed Dec. 16, 1983, now abandoned.

The present invention relates to a pseudo-random binary sequence generator applicable to the digital coding of television pictures.

The principle of the digital coding of television pictures consists in making a cutting in each scanning line at a randomly addressable point, and rotating the segments located on both sides of the cutting point. This digital coding principle was described in the French patent application No. 78 21 888 filed on 20th July 1978 in the name of the French Public Broadcasting Corporation "Télédiffusion de France" relating to its application to a black and white video signal or a composite colour signal with frequency-division multiplexing of the SECAM, PAL and NTSC type, for example. The French patent application No. 82 15 533 filed on 14th Sept. 1982 in the name of the company La Radiotechnique describes a novel application of this principle to a video colour signal with time-division multiplexing of analog components, of the type MAC, for example. In this latter case the different components are treated separately, that is to say each are separately subjected to the operations of cutting and permutation. The addresses of the cutting points to be supplied must therefore be equal in number to the number of components: two in the case of MAC coding (the luminance Y and, alternatively, one or other of the colour difference components U and V), three in the case where the three components Y, U and V, etc. are transmitted with each line.

The addresses of the cutting points are supplied by a pseudo-random binary sequence generator operating with a clock having the line frequency and thus varying pseudo-randomly from one line to the next. Identical generators are used at the transmitting and the receiving ends, and synchronization between transmission and reception can take place either with each frame or after a certain whole number of frames (every 50 frames for example, that is to say every second in Europe), a synchronization pulse being sent out by the transmitter in a particular picture line (the last line of a frame for example) or by way of data transmission during the picture blanking periods (see the systems Teletext, DIDON, etc.). The generators used for transmission and reception are initialized by a starting key, comprising a certain number $n_d$ of bits, and the user may either buy this key directly in the form of a passive key pad, or buy the means of decoding a coded key sent out by the transmitter by way of data transmission. The latter solution makes it possible to change the key as often as one wishes and thus gives a system with greater security but it implies at the receiving end the use of an active initialization circuit using a passive or active access card (memory-type or micro-processor).

In endeavouring to realize a television picture coding system it is very important to take into account the properties of the eye in regard to the recognition of shapes. It is found, for example, that if the picture lines are shifted in relation to each other by less than one cm in the case of a picture with a total width of 52 cm (which is the width of present television sets using cathode ray tubes with a screen diagonal of 66 or 67 cm), the picture is perfectly interpretable and only appears as slightly fuzzy when it is viewed from a sufficient distance. If on the other hand the cutting addresses are such that the line shifts which they involve have values of the order of 2 to 30 cm, distributed in an erratic way, the picture is seen as shifted over its entire width and is difficult to interpret. But if, on average, the same shift is repeated more than 10% of the time, the eye is capable, in the case of pictures of simple structure (a close-up for example), of recognising this picture which appears against a cluttered background. From the latter remark it may be deduced that the number of positions of possible cutting points must be greater than 10 in order that none of the positions will have more than a 10% chance of being occupied. It is therefore necessary to express the addresses with digital sequences having a number of independent significant bits equal at least to 4. The foregoing remark also shows that it is not necessary, from the point of view simply of visual observation, for the number of bits of these sequences to exceed 6, since 52 cm/$2^6$=0.8 cm.

A classical pseudo-random binary sequence generator comprises, in its simplest form, a shift register with n stages numbered 1 to n from the input to the output (see FIG. 1), comprising at least one intermediate output of rank k of which the result of the modulo 2 addition with the output of rank n is fed back to the input. The generating polynomial of this circuit is written:

$$x^n + x^{n-k} + x^{n-k'} \ldots + 1 = 0 \tag{1}$$

When this polynomial is irreducible and primitive, the generator delivers a pseudo-random sequence with a maximum length equal to $2^n - 1$, which comprises all the possible combinations of n bits with the exception of that composed of n consecutive zeros, which would cause blockage of the system, the latter delivering no more than zeros.

The use of this type of generator, however, presents two disadvantages in regard to coding effectiveness:

(1) to obtain an address comprising a number R of bits equal at least to 4, it is necessary either to provide for a number R of register outputs using intermediate taps, or to operate the register with a clock whose frequency is equal to the product of R by the line frequency $f_1$. In both cases the successive outputs, in the space or time domain, are very strongly correlated, since they are derived one from the other by a simple translation in the register, which greatly facilitates decoding when the key is not known. It may be remarked that, when R is less than or equal to the number of register cells n and when it is not a divisor of the length $2^n - 1$ of the sequence, the two solutions, in the space domain and time domain, are equivalent because, in R successive sequences, each time-domain output supplies all the bits of the sequence. In general there would be every interest in using a space-domain solution which requires the lowest clock frequency, equal to the line sweep frequency $f_1$.

(2) the complete sequence supplied by a psuedo-random sequence generator of this type can be found by solving a system of n linear equations with n unknowns when n address values are known, which can be done if one succeeds in identifying the position of n lines in the picture, having reference for example to a picture element containing a well-isolated vertical line.

To overcome the latter drawback, it is possible to use nonlinear operations over and above the modulo 2 addition (see the article by P. R. Geffe: "How to protect data with ciphers that are really hard to break", published in the journal Electronics, 4th Jan. 1973, pages 99 to 101). A particularly interesting version of such a circuit, referred to as a Geffe generator and described in particular in the article by E. L. Key: "An analysis of the structure and complexity of nonlinear binary sequence generators", published in the IEEE Transactions on Information Theory review, volume IT-22, No. 6, Nov. 1976, pages 732 to 736, consists in using three registers A, B, C, and using for example output a of the first register to switch the output of the system either on the output b of the second register, or on the output c of the third. FIG. 2a shows this generator, whose logic equation may be written:

$$S = \overline{a}b + ac \qquad (2)$$

(we recall here in FIG. 2b the truth tables of the principal logic operations: logic addition $a+b$, logic product $ab$, and modulo 2 addition or OR excluding $a \oplus b$, which latter operation may be written $a \oplus b = \overline{a}b + a\overline{b}$, noting $\overline{a}$ and $\overline{b}$ as the complements to 1 of a and b).

This Geffe generator has two important advantages. On the one hand, its output comprises a mean distribution equal to 0 and 1, which is very rarely the case when logic operations of the product type are introduced. On the other hand, to decode this device without knowing the key, it would be necessary to solve a system of $n_d$ equations, with $n_d = n_a + n_b + n_c$ ($n_a$, $n_b$, $n_c$ designating the number of register stages A, B and C respectively), but these equations are nonlinear and the solution of the system is difficult. It has been demonstrated, in the article by E. L. Key referred to above, that these $n_d$ nonlinear equations could be reduced to a system of linear equations, whose number however is in the neighborhood $n_a(n_b + n_c)$, which is a much larger number than $n_d = n_a + n_b + n_c$.

The use of a Geffe generator to obtain a pseudo-random address generator for the digital coding of television pictures has an extra advantage in the sense that a device comprising several simple generators is much more interesting than a device comprising a single simple generator having the same total number of $n_d$ stages. Instead of having $n_d$ correlated outputs, one has in effect three non-correlated sets of outputs which may be combined amongst each other.

Of course, in order for a Geffe generator to be maximally effective the generating polynomials of the three registers A, B, C must be irreducible and primitive, such that the sequences of bits a, b, c have maximum lengths, that is to say equal respectively to $2^{n_a}-1$, $2^{n_b}-1$, $2^{n_c}-1$, which three lengths must in addition be first among them in order that the length of a pseudo-random sequence, a combination of bits a, b and c, can be maximum and equal to $(2^{n_a}-1) \cdot (2^{n_b}-1) \cdot (2^{n_c}-1)$, a product whose value is of the order of magnitude of $2^{n_d}$.

The lengths $n_c$, $n_b$, $n_a$ of the three registers may for example be chosen equal respectively to:

3, 4, 5, when one has a key of 12 bits, the length of the sequence then being about 3,000:

3, 4, 7, when one has a key of 14 bits, the length of the sequence then being about 13,000:

3, 5, 7, when one has a key of 15 bits, the length of the sequence then being about 27,000;

3, 5, 8 or 4, 5, 7, when one has a key of 16 bits, the length of the sequence then being about 60,000;

4, 5, 9 or 5, 6, 7, when one has a key of 18 bits, the length of the sequence then being about 240,000;

4, 5, 11 or 5, 7, 8, when one has a key of 20 bits, the length of the sequence then being about 1,000,000.

The use of Geffe generators combining the different outputs of three identical registers A, B, C to generate address bits of cutting points with a view to encoding a television picture does, however, have one serious drawback: because of the properties of the eye in the matter of recognising shapes, and in particular because of its capacity to identify a picture the probability of whose presence is greater than about 10%, it is possible, by successive approximations, to decipher the device by first seeking in successive trials the $(n_b + n_c)$ bits corresponding to the initial word used to charge the registers B and C.

This statement can be verified by taking an example, that of a key of 16 bits, choosing $n_a = 7$, $n_b = 5$, $n_c = 4$, such that the order of complexity of the Geffe generators is of the order of: $7(4+5) = 63$. It is assumed that the 9 bits of the key corresponding to the initial word of the registers B and C (4 and 5 bits respectively) are known, and that the output of the generator A is unknown. For a bit with a given address one thus has one chance in two to have at the receiving end the same output as at the transmitting end (and thus of having the identity of the corresponding address bit), but equally there is one chance in two that these bits a will be opposed, which means that upon transmission the chosen address bit is for example a bit b, whereas that chosen at the receiving end is a bit c. Since these two bits are not correlated, there is one chance in two that they will be identical. On average, one thus has during half the time a probability of identity equal to one, whereas during the other half of the time one has a probability of identity equal to $\frac{1}{2}$, which gives an average probability of identity equal to $\frac{3}{4}$ for an address bit.

In the case of R address bits calculated on the basis of R Geffe generators using different outputs of the same three registers A, B, C, the probability of the same address being identical is thus equal to $(\frac{3}{4})^R$. As it was shown in the foregoing that, according to the properties of the eye, the number of significant address bits is equal at the most to 6, the maximum probability of address identity cannot in practice drop below $(\frac{3}{4})^6 = 0.18$, which gives a picture perfectly identifiable by the eye.

In practice, the situation is even worse since the probability of 0.18 corresponds to the case where different outputs are used for the six address bits. This means that one has necessarily employed generators comprising a number of stages equal at least to 6, and thus a total number of key bits equal to 21 if one is satisfied with a non-maximum sequence ($n_a = 8$, $n_b = 7$, $n_c = 6$) or equal to 24 ($n_a = 9$, $n_b = 8$, $n_c = 7$) if one wishes a maximum sequence. In the case where on chooses $n_b = 5$ and $n_c = 4$ (key of 16, 18 or 20 bits, as indicated above), one is obliged to use again, for the fifth address bit, a bit of C already used previously and, for the sixth address bit, two bits of B and C already used, which leads to a probability of identity in the order of 0.26 for 6 bits.

To decipher the system in a fraudulent manner and find again the 16 bits of the key, it thus suffices to operate in two steps: (1) to try successively the different combinations of 9 bits of the initial words of the registers B and C, which requires at the most $2^9 = 512$ attempts, on average 256 attempts only; (2) once these 9 bits have been found, to try successively the different combinations of the remaining 7 bits, which requires at the most $2^7 = 128$ attempts and, on average, 64 attempts. Since about one second is sufficient for trying each key, one can thus find the 16 bits of the key in 320 seconds on average (256+64), i.e. in about five minutes. This delay is comparable with the delay needed for finding 16 bits when it cannot be done in two steps: $2^{16}=65,536$ attempts at the most, or on average 32,768 attempts, which would require more than 9 hours on the basis of one attempt per second.

The result is that, given the same difficulty of deciphering by successive attempts with keys, a pseudo-random address generator using Geffe generators requires a number of key bits between 1, 7 and 2 times greater than would be necessary in a device not using the principle of the Geffe generator, and not permitting the recognition of bits in two successive steps. For example, if one estimates that an average time of the order of two hours is sufficient to discourage attempts at deciphering, this time can be obtained without a Geffe generator with a key of 14 bits, whereas with a Geffe generator as many as 26 bits would be necessary after choosing lengths of the registers A, B and C equal respectively to 13, 7 and 6.

SUMMARY OF THE INVENTION

A primary object of the invention is therefore to propose a pseudo-random binary sequence generator capable of providing addresses of at least 4 bits with probabilities of identical addresses being less than 10%, these addresses being at the same time much more difficult to decode, when the key is not known, than those provided by the generators known up to the present time, the generator simultaneously coping with the drawbacks of the Geffe generators when these are applied to the digital coding of television pictures.

To this end the invention relates to a pseudo-random binary address generator intended in particular for supplying cutting point addresses of a composite video signal, in the case of a frequency-division multiplexing system of the types SECAM, PAL or NTSC for example, or luminance and chrominance video signals in the case of a time-division multiplexing system using the analog components of the MAC type, for example, with a view to deciphering these video signals by rotation of the segments situated on both sides of each cutting point, in which there are three feedback shift registers and the generating polynomials of each of these registers are irreducible and primitive in order that the bit sequences a, b, c which they deliver shall be of maximum length, in which the number of the cells $n_a$, $n_b$, $n_c$ of the said registers are different, in which the three registers comprise several outputs $a_i$, $b_j$ and $c_k$, and in which the addresses of the cutting points are constituted by the sums of N terms of weight $2^0$ to $2^{N-1}$ and of the respective coefficients $S_0$ to $S_{N-1}$ of which at least the four heaviest weight coefficients are deduced from logic equations comprising at least one modulo 2 addition of three outputs $a_i$, $b_j$ and $c_k$, denoted ($a_i \oplus b_j \oplus c_k$), the ranks i, j and k being chosen different as far as the degrees $n_a$, $n_b$, $n_c$ of the registers so permit, and the other coefficients being chosen either fixed and equal, as the case may be, either 0 or 1 or deduced for one or several of them from outputs $a_i$, $b_j$ and $c_k$ with the aid of equations not comprising modulo 2 addition of three outputs.

The structure thus defined is advantageous for the following reasons. It has been seen that in the case of the Geffe generator the probability of address identity in the case of an address bit is $\frac{3}{4}$ when bits b and bits c are known, by reason of the fact that, when the values of bits b and c are equal, the output S is equal to that common value (see equation (2)), so that the value of bit a does not enter into it. The choice of a logic equation in which the change of one bit in three changes the output, whatever the values of the two bits not affected, overcomes this disadvantage because with this equation, for 1 address bit, the probability of address identity is equal to $\frac{1}{2}$. If the limitation of the addresses, examined later, has no effect on the efficacity of each address bit, and if the length of each register is equal at least to 4, the probability of address identity for 4 address bits is equal to $(\frac{1}{2})^4 = 6.25\%$, that is to say situated below the limit for the distinction of structure in a picture. The generator proposed is thus very well protected against deciphering attempts by making successive trials of the different keys.

Another nonlinear combination of three registers A, B and C has been proposed by Jan-Olof Brüer in a report from the University of Linköping (Sweden), No. LITH-ISY-I-0572, dated 31st Mar. 1983, entitled "On nonlinear combinations of linear shift register sequences". This combination, shown in FIG. 3, consists in making a modulo 2 addition or a logic addition (they both lead to the same result here) of three products:

$$S = ab \oplus bc \oplus ca = ab + bc + ca \qquad (3)$$

This Brüer generator, like the Geffe generator, offers a mean distribution equal to 0 and to 1, but its equivalent linear complexity is even greater because it is equal to $(n_a n_b + n_a n_c + n_b n_c)$. However, it presents the same drawback as the Geffe generator in that it permits deciphering by successive approximations. This derives from the fact that, the moment two outputs of two generators (A and B, or B and C, or C and A) are identical, the result no longer depends on the output of the third generator, as happened in the Geffe generator when the outputs of generators B and C were identical. Consequently the probability of decoding, that is to say the probability that two independent outputs will be identical, is $\frac{3}{4}$ per address bit, whereas it is only $\frac{1}{2}$ when only a modulo 2 addition is applied ($a \oplus b \oplus c$), for example.

In this patent application a solution is described which makes it possible to obtain, starting from three registers A, B and C, an equivalent linear complexity close to that of the Geffe generator without presenting the same drawback. The characteristic features of this solution are that the three registers have several outputs $a_i$, $b_j$ and $c_k$, and that the addresses of the cutting points are constituted by the sums of N terms of weights $2^{N-1}$ to $2^0$ and of respective coefficients $S_0$ to $S_{N-1}$ of which at least the four coefficients of greatest weight are deduced from logic equations comprising at least one modulo 2 addition of three outputs $a_j$, $b_j$ and $c_k$, denoted ($a_i \oplus b_j \oplus c_k$), the ranks i, j and k being chosen different in so far as permitted by the degrees $n_a$, $n_b$, $n_c$ of the registers, and the other coefficients being optionally fixed and then equal to 0 or to 1, or deduced for one or several among them from the outputs $a_i$, $b_j$ and $c_k$ with the aid of equations not involving a modulo 2 addition of three outputs.

When the number of bits of the key is not very high, when it is less than or equal to 20, for example, the same outputs of the registers may be used for several address bits, which reduces the effectiveness of the coding and increases the probability of decoding.

A second object of the invention is to remedy this reduction of effectiveness by calculating the M address bits of greatest weight successively starting from the values of outputs $a_i$, $b_j$, $c_k$ delivered at M different moments by the clock control in the registers.

In this respect the invention relates to a psuedo-random binary sequence generator designed in particular to deliver cutting point addresses of a composite video signal, in the case of a frequency-division multiplexing system of the types SECAM, PAL or NTSC for example, or cutting point address bits of luminance and chrominance video signals in the case of a time-division multiplex system of analogue components of the type MAC for example, with a view to implementing the encoding of these video signals by changing the order of the points of the two segments situated on either side of each cutting point, this generator comprising three feedback shift registers A, B and C in which the number of cells $n_a$, $n_b$ and $n_c$ are different and in which the generating polynomials are irreducible and primitive in order that the bit sequences a, b, c which they deliver shall be of maximum length, the addresses of the cutting points being deduced from the sums of N terms of weights $2^{N-1}$ to $2^0$ and or respective coefficients $S_0$ to $S_{N-1}$, in which the M coefficients $S_0$ to $S_{M-1}$ of greatest weight are delivered successively by the output of the generator, which operates at a clock frequency equal to or greater than M times the video signal line frequency, and in which this output is the result of a logic equation comprising at least two modulo 2 additions of three outputs $a_i$, $b_j$, $c_k$ of the three registers.

The structure of the generator thus proposed leads effectively to greater protection against deciphering attempts by successive trials of different keys. Of course, the lengths $(2^{n_a}-1)$, $(2^{n_b}-1)$, $(2^{n_c}-1)$ of the sequences delivered by the three registers, which are maximum, may here to be chosen first among them in order that the length of the pseudo-random sequences performed by the combinations of bits a, b, c shall itself be maximum.

The particularities and advantages of the invention will now be shown more exactly in the description which follows and in the appended drawings.

DESCRIPTION OF THE FIGURES

FIGS. 7a and 7b gives an example of an embodiment of a pseudo-random binary sequence generator in accordance with the invention.

DESCRIPTION OF THE PREFERRED EMBODIMENTS

Figure 1:
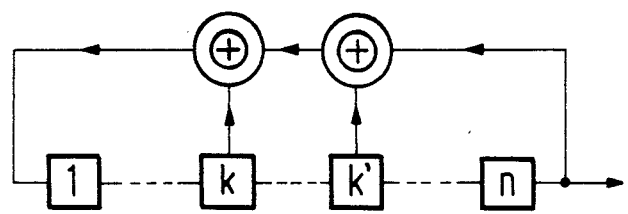
FIG. 1 represents a pseudo-random binary sequence generator of the classic type with n cells.
Figure 2:
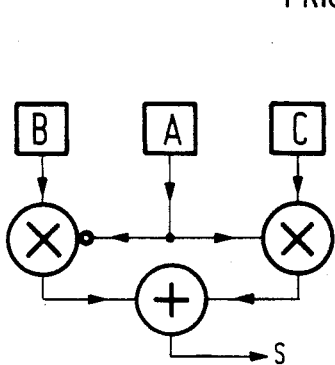
FIG. 2 represents a Geffe generator with three registers.
Figure 3:
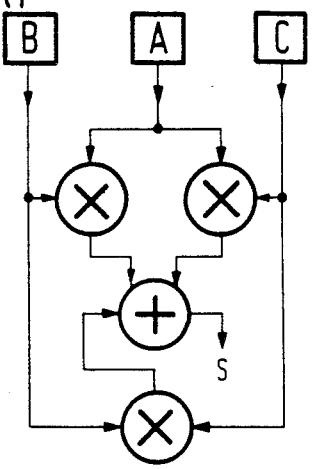
FIG. 3 represents a Brüer generator with three registers.

The truth tables of the logic operations of addition, of product and of modulo two addition are recalled as being:

TABLE 1

| | a + b | |
|---|---|---|
| | | a |
| b | 0 | 1 |
| 0 | 0 | 1 |
| 1 | 1 | 1 |

TABLE 2

| | a · b = ab | |
|---|---|---|
| | | a |
| b | 0' | 1 |
| 0 | 0 | 0 |
| 1 | 0 | 1 |

TABLE 3

| | a ⊕ b | |
|---|---|---|
| | | a |
| b | 0 | 1 |
| 0 | 0 | 1 |
| 1 | 1 | 0 |

Table 4 illustrates schematically the decoding probabilities of the first, second, third and fourth modes of implementation of the invention proposed hereinafter, as a function of the number of address bits utilized, in the case where the degrees $n_a$, $n_b$, $n_c$ of the registers are such that $n_a=$ at least 7, $n_b=5$, $n_c=4$, and when there is no loss of efficacity due to limitation of the addresses;

TABLE 4

| | | Number of address bits | | | |
|---|---|---|---|---|---|
| | | 3 | 4 | 5 | 6 |
| Decoding probability for same b and c | Solutions 1, 2, 4 | 12,5% | 6,25% | 3,1% | 1,6% |
| | Solution 3 | " | " | " | 3,1 or 1,6* |
| Decoding probability for same a and b or same a and c | Solution 1 | 12,5 | 6,25 | 6,25 | 6,25 |
| | Solution 2 | 12,5 | 9,4 | 6,25 | 6,25 |
| | Solution 3 | 18,7 | 12,5 | 9,4 | 6,25 |
| | Solution 4 | 12,5 | 9,4 | 6,25 | 6,25 |

*when 8 outputs of register A are used ($n_a > 7$)

Table 5 illustrates schematically the decoding probabilities of the first, second, third and fourth modes of implementation of the invention, as a function of the number of the address bits utilized, in the same case as that of Table 4, but with a loss of efficacity due to limitation of the addresses.

TABLE 5

| | | Number of address bits | | | |
|---|---|---|---|---|---|
| | | 3 | 4 | 5 | 6 |
| Decoding probability | Solution 1, 2, 4 | 15,6% | 8,8% | 4,4% | 2,2% |

TABLE 5-continued

| | | Number of address bits | | | |
|---|---|---|---|---|---|
| | | 3 | 4 | 5 | 6 |
| for same b and c | Solution 3 | 15,6 | 8,8 | 4,4 | 3,5 or 2,2* |
| Decoding probability | Solution 1 | 15,6 | 8,8 | 7,8–7 (a and b) (a and c) | 6,25 |
| for same a and b | Solution 2 | 15,6 | 12,2 | 8,3 | 8,3 |
| or same a and c | Solution 3 | 20,3 | 14,8 | 11 | 7,4 |
| | Solution 4 | 15,6 | 12,2 | 8,3 | 8,3 |

*when 8 outputs of register A are used ($n_a > 7$).

In a first form of embodiment of the invention, the generator is thus a Geffe generator with three feedback shift registers A, B, C whose generating polynomials are irreducible and primitive, such that the bit sequences a, b, c which they deliver are of maximum length, that is to say equal respectively to $2^{na}-1$, to $2^{nb}-1$, and to $2^{nc}-1$, where $n_a$, $n_b$ and $n_c$ are the numbers of the respective cells or degrees, the registers A, B and C, and being conventionally chosen such that $n_a$ is greater than $n_b$, itself being greater than $n_c$. The lengths of the three registers, which are maximum, have been chosen here as first among them, in order that the length of the pseudo-random sequences formed by the combinations of bits a, b, c shall themselves be maximum and equal to the product $(2^{na}-1)\cdot(2^{nb}-1)\cdot(2^{nc}-1)$.

An arbitrary cutting point address S being expressed by the sum S of N terms of weight $2^0$ to $2^{N-1}$ affected by the respective coefficients $S_0$ to $S_{N-1}$, written as:

$$S = \sum_{h=0}^{h=N-1} S_H 2^h \qquad (4)$$

an object of the invention is achieved if at least the four coefficients of greatest weight, $S_{N-1}$, $S_{N-2}$, $S_{N-3}$ and $S_{N-4}$, are derived from logic equations each consisting of a modulo 2 addition of the type $S_h = a_i \oplus b_j \oplus c_k$, where $S_h$ is the generic term of the sum S defining the address and $a_i$, $b_j$, $c_k$ are the outputs of the three registers A, B and C. Preferentially, the ranks i, j, k are chosen differently, in so far as permitted by the degrees $n_a$, $n_b$, $n_c$. The latter address coefficients are either fixed or chosen equal to 0 or to 1, or deduced for several of them from among the outputs $a_i$, $b_j$ and $c_k$ with the aid of equations not comprising modulo 2 addition of the three outputs. The probability of address identity is now, for four address bits equal to $(\frac{1}{2})^4 = 6.25\%$, a value which is much lower than the 10% noted in the foregoing as the limit value for recognising a structure in a picture.

The modulo 2 addition:

$$S_h = a_i \oplus b_j \oplus c_k \qquad (5)$$

can thus be written, explaining the logic operations:

$$S_h = a_i(\overline{b_j}c_k + b_j\overline{c_k}) + \overline{a_i}(b_j c_k + \overline{b_j}\overline{c_k}) \qquad (5\ bis)$$

These equations (5) or (5 bis) represent a linear system, and an attempt at deciphering only requires the solution of a number of linear equations equal to the number of bits $n_d$ of the key ($n_d$ being equal to $n_a + n_b + n_c$). To make this mathematical solution more difficult, it is possible, in a second mode of embodiment of the invention, to employ, for the first address bit of greatest weight, a logic equation containing for example two different modulo 2 additions of the type $(a \oplus b \oplus c)$, the choice of which is dictated by the value of another bit a or b or c. If one chooses $n_a$ greater than $n_b$, itself being greater than $n_c$, this multiplier bit results from the longest register A. To avoid using more than two register outputs per address bit, one can use the same output a in the two sums.

In this second mode of embodiment, the logic equation of the first strongest weight coefficient can thus be written:

$$S_{N-1} = \overline{a_i}(a_{i'} \oplus b_j \oplus c_k) + a_i(a_{i'} \oplus b_{j'} \oplus c_{k'}) \qquad (6)$$

or $$S_{N-1} = \overline{a_i}(\overline{a_{i'}} \oplus b_j \oplus c_k) + a_i(\overline{a_{i'}} \oplus b_{j'} \oplus c_{k'}) \qquad (6\ bis)$$

These two expressions (6) and (6 bis), in which we have used the same output $a_{i'}$ in the two sums in order to avoid employing three outputs a for one single address bit, differ only in the fact that one uses either $a_{i'}$ or its complement $\overline{a_{i'}}$ in the second sum. If the complexity of the circuit is not significantly increased, it is preferable to use expression (6 bis) because the fact of using $\overline{a_{i'}}$ diminishes the similitude between the two sums.

The logic equations giving at least three of the following strongest weight coefficients remain in the form:

$$S_h = a_{i''} \oplus b_{j''} \oplus c_{k''} \qquad (7)$$

the ranks i'', j'', k'' being here again chosen differently, in so far as the degrees $n_a$, $n_b$ and $n_c$ permit. The latter address coefficients are fixed and chosen equal to 0 or to 1, as the case may be.

In a third mode of embodiment of the invention, the logic equation of the second strongest weight coefficient $S_{N-2}$ is also the type of equations (6) or (6 bis), with the coefficients i j k chosen differently, and the logic equations giving at least two of the strongest weight coefficients following the type of equation (7). The other coefficients are fixed and are equal to 0 or 1. This third mode of embodiment offers greater protection against mathematical deciphering, since the two strongest weight coefficients contain products and their order of complexity is thus close to that of $n_a(n_b + n_c) = 63$, for example, since $n_a$, $n_b$ and $n_c$ are respectively 7, 5 and 4.

However, the two coefficients of greatest weight, $S_{N-1}$ and $S_{N-2}$, each use two outputs of register A, two outputs of register B and two outputs of register C. If the length of the shortest register C is only 4, for example, one will thus find in the following address coefficients some outputs of C that have already been used, which will increase the probability of address identity and, consequently, the risk of deciphering by successive trials with keys.

To overcome this drawback one can, in a fourth mode of embodiment of the invention, choose as multiplicative terms the register outputs of least length, taking for example an output of register B for the first coefficient and an output of register C for the second. The logic equations of the strongest weight coefficients may then be written:

$$S_{N-1} = \overline{b_j}(a_i \oplus b_j \oplus c_k) + b_j(a_{i'} \oplus b_{j'} \oplus c_{k'}) \qquad (8)$$

or $$S_{N-1} = \overline{b_j}(a_i \oplus b_j \oplus c_k) + b_j(\overline{a_{i'} \oplus b_{j'} \oplus c_{k'}}) \qquad (8 \text{ bis})$$

and $$S_{N-2} = \overline{c_{k''}}(a_{i'} \oplus b_{j'} \oplus c_{k''}) + c_{k''}(a_{i'''} \oplus b_{j'''} \oplus c_{k'''}) \qquad (9)$$

or $$S_{N-2} = \overline{c_{k''}}(a_{i'} \oplus b_{j'} \oplus c_{k''}) + c_{k''}(\overline{a_{i'''} \oplus b_{j'''} \oplus c_{k'''}}) \qquad (9 \text{ bis})$$

In this case, as in the foregoing, the logic equations giving at least two of the strongest weight coefficients, are of the type:

$$S_h = a_{i''''} \oplus b_{j''''} \oplus c_{k''''} \qquad (10)$$

taking the ranks i j k as different as the degrees of the registers permit, and the latter coefficients are fixed and equal to 0 or 1.

With the fourth mode of embodiment, the orders of complexity of the two first coefficients approximate respectively to $n_b(n_a+n_c)$ and $n_c(n_a+n_b)$, or, respectively 55 and 48 in the example chosen above ($n_a=7$, $n_b=5$, $n_c=4$). These orders of complexity are thus slightly inferior to those of the second mode of embodiment. This system however, is better protected against deciphering by successive attempts with keys, since it may be noted that the coefficient $S_{N-1}$ always depends on $b_j$, and that the coefficient $S_{N-2}$ always depends on $c_{k''}$, which makes it possible to use again the outputs $b_j$ and $c_{k''}$ for the third or fourth coefficient $S_{N-3}$ or $S_{N-4}$ without reducing their effectiveness.

In the four modes of embodiment proposed in the foregoing the protection is maximum relative to deciphering by successive stages that would begin by the shortest bits of the registers B and C. However, the protection relative to deciphering beginning with the bits of the registers A and B or of registers A and C should also be investigated. In the case where the degrees of the registers are for example equal to 5, 4 and 3, deciphering beginning with bits A and C would require no more, on average, than $\frac{1}{2}(2^{5+3}+2^4)=(128+8)$ attempts, or about two minutes, whereas if this deciphering were not possible on the basis of A and C, an average of 2,048 attempts or 34 minutes, would be required; in the case where the degrees of the registers are equal to 7, 5, 4, an average of 17 minutes would be required instead of 9 hours. By way of example, the abovementioned table 4 indicates the decoding probabilities of the four modes of embodiment proposed, as a function of the number of address bits utilized, in the case where the degrees $n_a$, $n_b$, $n_c$ are such that $n_a$=at least 7, $n_b=5$ and $n_c=4$, and when there is not, of course, any loss of effectiveness due to limitation of addresses (which will now be discussed).

The generator described in the foregoing, in four possible forms of embodiment, is capable of delivering $2^N$ different addresses of value 0 to $2^N-1$ (it has already been shown that any cutting point address was expressed by a sum S of N terms $S_h 2^h$ of weight $2^0$ to $2^{N-1}$ given the respective coefficients $S_0$ to $S_{N-1}$). When the number M of samples stored each line in the memory is slightly greater than a power of 2, there is no problem of exceeding the limits if N is chosen equal to the power of 2 just lower than M. It may happen, however, that the number M will be very slightly lower than a whole power of 2: in this case, the preceding choice of N will lead to permutations corresponding to line translations maximally equal to about the half-width of the picture, which would cause a loss of scrambling effectiveness. This eventuality may occur in particular in the case of the scrambling of a standard European PAL coded signal, when a sampling frequency is chosen equal to four times the colour subcarrier frequency (i.e. 17,734 Megahertz for this sampling frequency) to avoid interference between these two frequencies.

Figure 4:
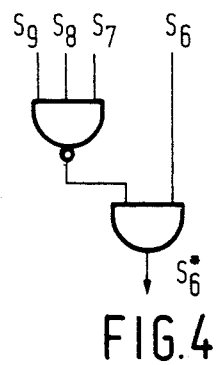
FIGS. 4, 5 and 6 schematize the circuits used in the case of address limitation.

In this case, the number of points stored each line in the memory does not in practice exceed 990, taking into account the part of the signal sacrificed to permit the repetition of a zone in the neighbourhood of the cutting point (a redundancy characteristic). To obtain translations approximating to the width of the picture without exceeding it, one may thus choose for example N=10, or 1,024 possible addresses, and cause $2^p$ of these addresses, comprised between $2^N-2^p$ and $2^N-1$, to undergo a reduction by a quantity $2^q$, p being chosen such that $2^N-2^p$ is less than M and q being chosen equal to or greater than p but such that $2^q$ is less than $2^N-2^p$. In the example quoted, one may choose for example p and q both equal to 6, which amounts to reducing by 64 the 64 addresses greater than or equal to 960. This operation amounts to forcing the coefficient $S_6$ to the value 0 when the coefficients $S_7$, $S_8$ and $S_9$ are all three equal to 1, which can be obtained very simply by means of the circuit indicated in FIG. 4 which uses an AND gate with two inputs and a NAND gate with three inputs, verifying the equation:

$$S^*_6 = S_6 \cdot \overline{(S_7 \cdot S_8 \cdot S_9)} \qquad (11)$$

It should be noted that this operation reduces the effectiveness of the coefficient $S_6$, which only influences the delivered address during $\frac{7}{8}$ths of the time.

In any case, the television signals stored in the memory always comprise an initial reference period containing either the black level where it relates to a black- and -white signal or a luminance signal, or a reference threshold superimposed on the black level when it relates to a composite colour signal of the type PAL, SECAM or NTSC, or a reference level corresponding to the colour difference zero level when it relates to a colour difference signal U or V (in the case of MAC coding for example). As this reference level could be referred to relatively easily in the enciphered signal, it is important, in order to avoid deciphering of the picture, not to apply the permutation in this period, which amounts to inhibiting the cutting point addresses that fall in these reference periods.

Figure 5:
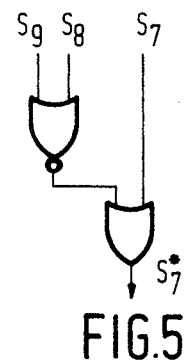

A simple means of realizing this inhibition consists in augmenting the $2^r$ addresses supplied by the generator, comprised between 0 and $2^r-1$, by a quantity $2^s$, r being chosen such that $2^r$ is greater than the length L of the reference segment, and s being chosen equal to or greater than r such that $2^s$ is less than $M-2^r$. In the example quoted, the length L does not exceed 100 sampled elements. One may thus choose, for example, r and s both equal to 7, which amounts to adding 128 to 128 first addresses, comprised between 0 and 127. This operation amounts to forcing the coefficient $S_7$ to the value 1 when the coefficients $S_8$ and $S_9$ are both equal to 0, which can be obtained very simply by means of the circuit indicated in FIG. 5, which uses an OR gate and a NOR gate with two inputs, verifying the equation:

$$S^*_7 = S_7 + \overline{(S_8 + S_9)} \tag{12}$$

Here again, it should be noted that this operation reduces the effectiveness of the coefficient $S_7$, which only influences the supplied address during ¾ of the time.

In the case of the first form of embodiment described (see equations (5) and (5 bis)), the probability of address identity for four significant address bits $S_6$ to $S_9$ thus becomes equal, in the example quoted and in the case where the smallest register comprises at least four cells, to:

$$\tfrac{1}{2} \times \tfrac{1}{2} \times [(\tfrac{3}{4} \times \tfrac{1}{2}) + (\tfrac{1}{4} \times 1)] \times [(\tfrac{3}{4} \times \tfrac{1}{2}) + (\tfrac{1}{4} \times 1)] = 8.8\% \tag{13}$$

By way of example, the abovementioned table 5 indicates as a function of the number of address bits the probabilities of address identity calculated in the case of lower and higher preceding limits, for the first, second, third and fourth forms of embodiment proposed, in the case where the lengths of the registers are respectively 4 for C, 5 for B and greater than or equal to 7 for A.

It can be seen that the probability of decoding is equal to the minimum probability when the bits of B and C are known at the same time (9 bits). On the other hand, when the bits A and B are known at the same time (at least 12 bits) or A and C at the same time (at least 11 bits), the probability of decoding is greater than the minimum probability, and only drops below the 10% threshold of perception when one uses at least four address bits in the solution 1, five bits in the solutions 2 and 4, and six bits in solution 3. It may be noted in addition that the example of the limits quoted applies equally to the PAL and SECAM systems in Europe, when the clock frequency $f_H$ is chosen at about 17,734 MHz, as well as to the NTSC system in the countries using the 525 lines standard, with 30 pictures per second, when a clock-frequency is chosen about five times the colour subcarrier frequency of NTSC, i.e. 17.9 MHz.

In the case of a time-division multiplexing system of analog components, the generator has to supply as many cutting point addresses as there are components in each line, that is to say for example two in the case of the MAC system (where the components are Y and, alternatively, U and V). As the luminance and chrominance components comprise information of comparable form, no element of secrecy is lost when analogous rotations are applied to these components, that is to say when the two addresses are calculated on the basis of the same outputs of the same shift registers and using the same logic equations. This makes it possible to have an address generator whose complexity is in practice no greater than in the preceding case, except that the problem of the limits may differ depending on the components.

If one assumes, for example, that the generator supplies six variable coefficients $A_0$ to $A_5$ deduced from the foregoing operations and taking $N=6$, and also that we have the case of a MAC signal such that the duration of the luminance component is about twice that of the chrominance component, with a clock frequency such that the useful capacity of the luminance and chrominance memories is slightly less than 512 and 256, respectively, we can then take for the luminance $N_Y=9$ and for the chrominance $N_C=8$, choosing as coefficients the address expression (formed, it will be recalled, from a sum of N terms $S_h 2^h$):

- for the luminance $$S_{Yh} = A_{(h-3)} \text{ for } h \geq 3$$

$$\text{and } = 0 \text{ for } 0 \leq h \leq 2$$

- for the chrominance $$S_{Ch} = A_{(h-2)} \text{ for } h \geq 2$$

$$\text{and } = 0 \text{ for } 0 \leq h \leq 1$$

after having subjected $A_2$ and $A_3$ to the same operations as those described in the foregoing for $S_6$ and $S_7$ (FIGS. 4 and 5) to inhibit the address segments situated at the extremities.

One might also have the case of a MAC signal with a clock frequency such that the useful capacity of the luminance memory is closer to 768 than to 512 ($=2^9$) or to 1024 ($=2^{10}$). A first solution consists then in choosing $N_Y=10$ and in forcing to 0 the coefficient $S_{Y8}$, as well as possibly a weaker weight coefficient ($S_{Y6}$ or $S_{Y5}$) when the strongest weight coefficient $S_{Y9}$ is equal to 1, but this solution has the drawback of reducing by a factor of ½ the effectiveness of the second strongest weight coefficient $S_{Y8}$ and of equally reducing the effectiveness of the two other coefficients, taking account of the lower limit. A second solution consists in choosing $N_Y=9$, which gives 512 possible addresses, and in choosing, for the translation of the addresses comprised between 0 and $2^r-1$, a quantity $2^s=2^9=512$, which is possible, for example, when the length of the reference level is less than 128 and when the length M of the signal is comprised between 640 and 896.

The luminance address coefficients are then chosen as follows:

$$S_{Yh} = A_{(h-3)} \text{ for } 3 \leq h \leq 8$$

$$= 0 \text{ for } 0 \leq h \leq 2 \text{ and}$$

$$S_{Y9} = 1 \text{ when } S_{Y8} = S_{Y7} = 0$$

$$\text{and } = 0 \text{ in all other cases.}$$

Figure 6:
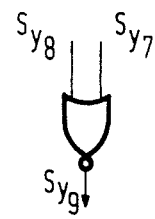

This amounts to choosing $$S_{Y9} = \overline{S_{Y8} + S_{Y7}}, \tag{14}$$

which can very easily be obtained with a NOR gate with two inputs as indicated in FIG. 6. This second solution offers the advantage that the effectiveness of the six coefficients $A_0$ to $A_5$ remains intact. The probabilities of decoding are then as indicated in table 4. This latter type of solution can also be applied in the case of a MAC signal with a clock frequency such that the useful capacity of the chrominance memory is closer to 384 than to 256 ($=2^8$) or to 512 ($=2^9$). The chrominance address coefficients would then be chosen as follows:

$$S_{Ch} = A_{(h-2)} \text{ for } 2 \leq h \leq 7$$

-continued $$= 0 \text{ for } 0 \leq h \leq 1$$

and $$S_{C_8} = \overline{S_{C_7} + S_{C_6}}. \tag{15}$$

Figure 7A:
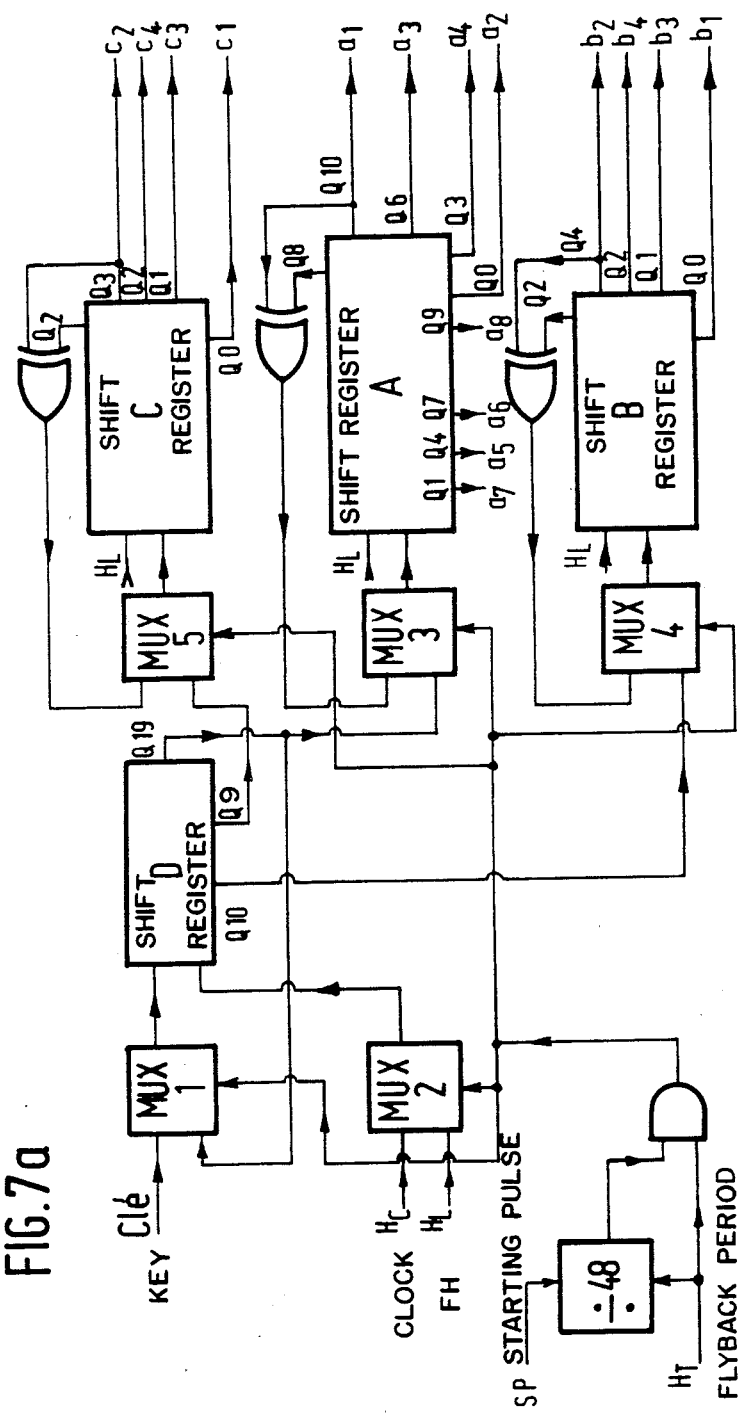

FIG. 7, made by the association of the parts of FIGS. 7a and 7b, shows an example of the practical embodiment of a pseudo-random binary address generator adapted to PAL, SECAM and NTSC signals. The lengths of the three registers A, B, C have been chosen respectively equal to 11, 5 and 4, which permits about 950,000 different keys of 20 bits. The irreducible and primitive generating polynomials, chosen in order to avoid having to have more than one intermediate tap on each register, are the following:

$$x^{11} + x^2 + 1 = 0$$

$$x^5 + x^2 + 1 = 0$$

$$x^4 + x + 1 = 0$$

Use is made of eight outputs $a_1$ to $a_8$ of A, four outputs $b_1$ to $b_4$ of B and four outputs $c_1$ to $c_4$ of C, which are applied respectively to the 16 inputs of a programmable logic network PLN, for example of the type 82 S 100, made by the Signetics company. This PLN provides eight outputs $A_0$ to $A_7$, used for supplying 8 variable address bits $S_2$ to $S_9$, the two address bits with the lowest weight $S_0$ and $S_1$ being equal to 0. As seen in the foregoing, to inhibit the addresses comprised between 0 and 127 and those comprised between 960 and 1,023, the coefficients $S_6$ and $S_7$ are deduced from the outputs $A_5$, $A_6$, $A_7$ in accordance with the programmed schemata such that they provide, in conformity for example with the fourth form of embodiment of the invention, an output $A_7$ according to equation (8 bis), an output $A_6$ according to equation (9 bis), and six outputs $A_0$ to $A_5$ according to equation (10). By way of example, the following equations have been chosen:

$$A_7 = \overline{b_1}(a_3 \oplus b_4 \oplus c_1) + b_1(a_7 \oplus \overline{b_4} \oplus c_4)$$

$$A_6 = \overline{c_3}(a_4 \oplus b_3 \oplus c_2) + c_3(a_8 \oplus b_2 \oplus \overline{c_2})$$

$$A_5 = a_1 \oplus b_1 \oplus c_3$$

$$A_4 = a_5 \oplus b_3 \oplus c_1$$

$$A_3 = a_6 \oplus b_2 \oplus c_4$$

$$A_2 = a_2 \oplus b_4 \oplus c_2$$

$$A_1 = a_3 \oplus b_1 \oplus c_3$$

$$A_0 = a_8 \oplus b_3 \oplus c_1$$

The two first equations necessitate 8 products, the following ones 4. Thus, use is made of 40 products among the 48 available from the network 82 S 100. As seen, the two address bits $S_2$ and $S_3$, deduced from $A_0$ and $A_1$, correspond to translations that are too weak to make any significant contribution to scrambling as perceived by the eye. Their use, however, reinforces the encoding vis-à-vis an attempt at mathematical decoding; it makes it more difficult to identify the sets of addresses introduced by the coefficients $S_4$ to $S_9$ since they introduce three possible supplementary addresses between each of the addresses supplied by $S_4$ to $S_9$.

In the generator shown in FIG. 7A, the registers A, B and C are loaded at regular intervals with their respective initial words of lengths $n_a$, $n_b$ and $n_c$. These words, placed end to end, constitute the key of length $n_d = 20$ bits. This key is supplied either by a decoder pad or is sent out by the transmitter in encoded form, then decoded by an access circuit which is not shown. When a new key arrives, it is transferred to a shift register D of 20 stages, the key being accompanied by 20 pulses of a clock $H_c$ through the intermediary of multiplexers $MUX_1$ and $MUX_2$, beginning for example with the bits destined for registers C, then B, then A. At the end of the 20 pulses from the clock $H_c$, one thus finds in register D the initial word of register A at the outputs $Q_0$ to $Q_{10}$, the initial word of register B at the outputs $Q_{11}$ to $Q_{15}$ and the initial word of register C at the outputs $Q_{16}$ to $Q_{19}$.

At regular intervals, equal here to 48 frames, the output of register D is fed back to its input through the intermediary of the multiplexer $MUX_1$. The outputs $Q_{19}$, $Q_{10}$ and $Q_{15}$ are connected to the inputs of registers A, B and C through the intermediary of the multiplexers $MUX_3$, $MUX_4$, $MUX_5$, the loops of these registers being opened at the same time, and one applies to register D through the intermediary of $MUX_2$, during 20 consecutive clock pulses, the same clock $H_L$ having the frequency of the line scan as that which is permanently applied to registers A, B and C. At the end of the 20 pulses of the clock $H_L$, the words stored in the registers A, B and C then correspond to the bits initially stored in register D between the outputs $Q_0$ and $Q_{10}$ for A, $Q_{11}$ and $Q_{15}$ for B, $Q_{16}$ and $Q_{19}$ for C respectively. Moreover, because of the output of D being fed back to its input during this operation, this register is returned to its initial state at the end of the 20 clock pulses and thus plays the role of memory for the key.

The operation of loading registers A, B and C, starting from register D, is effected during a flyback period (registered by the clock $H_T$ at the scanning frequency) during all the 48 frames, that is to say at about every second in the example quoted, synchronization with the transmitter being obtained with the aid of a starting pulse SP sent out by the transmitter either by way of data transmission, or in a special picture line. Outside these periods during which A, B and C are loaded, the register D is connected to the access control circuit through the intermediary of the multiplexers $MUX_1$ and $MUX_2$, and is thus ready to receive any new key from this circuit. Of course, for large-scale production the set of circuits represented in FIG. 7 can be integrated on a single silicon chip with a chip area of a few mm².

The abscissas x of the cutting points are deduced from the sum S of N terms of weight $2^{N-1}$ to $2^0$ effected by respective coefficients $S_0$ to $S_{N-1}$:

$$S = \sum_{h=0}^{h=N-1} S_n 2^{N-h-1}, \tag{16}$$

the M coefficients $S_0$ to $S_{M-1}$ of greatest weight being calculated starting from the outputs of registers A, B and C, the other coefficients being chosen optionally zero or equal to 1. In the case of a PAL, SECAM or NTSC signal sampled at a frequency of the order of 18 MHz, it is wise to choose N=8

$$x = 4S + 128 \text{ when } S < 32$$

$$x = 4S - 64 \text{ when } S \geq 240$$

in order to prevent the cutting point from falling in the reference signal which precedes the useful signal or coming above the last useful point of the line.

In the case of a MAC signal sampled at 13.5 MHz for the luminance Y and at 6.75 MHz for the chrominance C, it is again wise to choose $N=8$ and to take respectively for the cutting addresses in luminance and in chrominance either:

$$x_y = 2S + 128$$

and $$x_c = S + 64$$

or $$x_y = 2S + 64$$

and $$x_c = S + 32$$

In three modes of embodiment of the invention, referred to as the fifth, sixth and seventh, each of the M coefficients is calculated on the basis of several outputs of the registers A, B and C measured at the same instant. The clock frequency F which has to be used is then equal to at least M times the video signal line frequency $F_2$. For a line period of $(1/F_2) = 64$ μs, in Europe, the coefficients may be calculated, for example, starting from values of the outputs at the instants:

$$t_o + k64 \text{ μs for } S_0$$

$$t_o + (1/F) + k64 \text{ μs for } S_1$$

$$t_o + (2/F) + k64 \text{ μs for } S_2, \ldots, \text{ etc.}$$

In the fifth mode of embodiment proposed, the three registers each have two outputs denoted $a_0$, $a_1$, $b_0$, $c_0$ and $c_1$ and the logic equation is derived from the Geffe generator, introducing modulo 2 additions, and is of the form:

$$a_1(a_0 \oplus b_0 \oplus c_0) + \bar{a}_1(a_0 \oplus b_1 \oplus c_1) \quad (17)$$

or $$a_1(a_0 \oplus b_0 \oplus c_0) + \bar{a}_1(\bar{a}_0 \oplus b_1 \oplus c_1) \quad (18)$$

the second expression offering the advantage over the first that the second modulo 2 sum is made even more different from the first by using the complement to 1 of $a_0$ instead of $a_0$ itself.

In the sixth mode of embodiment proposed, the register A has three outputs denoted $a_0$, $a_1$ and $a_2$, the registers B and C each have two outputs denoted $b_0$, $b_1$, $c_0$ and $c_1$ and the logic equation, derived from the Geffe generator, is of the form:

$$a_2(a_0 \oplus b_0 \oplus c_0) + \bar{a}_2(a_1 \oplus b_1 \beta c_1) \quad (19)$$

in which expression the two modulo 2 sums do not have a common element.

In the seventh mode of embodiment proposed, the three registers each have three outputs denoted $a_0$, $a_1$, $a_2$, $b_0$, $b_1$, $b_2$, $c_0$, $c_1$ and $c_2$ and the logic equation is derived from the Brüer generator, introducing modulo 2 additions, and comprises the logic addition of the three logic products effected between two modulo 2 additions of different outputs:

$$(a_0 \oplus b_0 \oplus c_0)(a_1 \oplus b_1 \oplus c_1) + (a_1 \oplus b_1 \oplus c_1)(a_2 \oplus b_2 \oplus c_2) + (a_2 \oplus b_2 \oplus c_2)(a_0 \oplus b_0 \oplus c_0)$$

In an eighth mode of embodiment, in accordance with the invention, the three registers have only one output and the logic equation, derived from the Geffe generator, is a function of three outputs $a_0$, $b_0$, $c_0$ at the instant $t_0$ and of three outputs $a_1$, $b_1$, $c_1$ at the instant $t_0 + 1/F$ or $t_0 - 1/F$ and is of the form:

$$a_1(a_0 \oplus b_0 \oplus c_0) + \bar{a}_1(a_0 \oplus b_1 \oplus c_1) \quad (17)$$

or $$a_1(a_0 \oplus b_0 \oplus c_0) + \bar{a}_1(\bar{a}_0 \oplus b_1 \oplus c_1) \quad (18)$$

In a ninth mode of embodiment, in accordance with the invention, the register A has two outputs, the registers B and C each have one output and the logic equation, derived from the Geffe generator, is a function of the values $a_0$, $b_0$, $c_0$ of three outputs at the instant $t_0$, of the values $a_1$, $b_1$, $c_1$ of these three same outputs at the instant $t_0 + 1/F$ and of the value $a_2$ of the second output of register A at the instant $t_0$ or $t_0 + 1/F$, and is of the form:

$$a_2(a_0 \oplus b_0 \oplus c_0) + a_2(a_1 \oplus b_1 \oplus c_1) \quad (19)$$

In the eighth and ninth modes of embodiment, for a line period of $(1/F_2) = 64$ μs, the coefficients may be calculated, for example, starting from output values at the instants:

$$t_0 + k64 \text{ μs and } t_0 + (1/F) + k64 \text{ μs for } S_0$$

$$t_0 + (2/F) + k64 \text{ μs and } t_0 + (3/F) + k64 \text{ μs for } S_1$$

$$t_0 + (4/F) + k64 \text{ μs and } t_0 + (5/F) + k64 \text{ μs for } S_2, \ldots$$
etc.

The clock frequency F which must be used in these eighth and ninth modes of embodiment is thus equal at least to 2M times the frequency $F_2$.

In a tenth mode of embodiment, in accordance with the invention, the three registers have only one output and the logic equation, derived from the Geffe generator, is a function of three outputs $a_0$, $b_0$, $c_0$ at the instant $t_0$, of three outputs $a_1$, $b_1$, $c_1$ at the instant $t_0 + (1/F)$ and of one output $a_2$ at the instant $t_0 + (2/F)$ or $t_0 - (1/F)$ and is of the form:

$$a_2(a_0 \oplus b_0 \oplus c_0) + \bar{a}_2(a_1 \oplus b_1 \oplus c_1) \quad (19)$$

In an eleventh and last mode of embodiment, in accordance with the invention, the three registers have only one output and the logic equation, derived from the Brüer generator, is a function of three outputs $a_0$, $b_0$, $c_0$ at the instant $t_0$, of three inputs $a_1$, $b_1$, $c_1$ at the the instant $t_0 + (1/F)$ and of three output $a_2$, $b_2$, $c_2$ at the instant $t_0 + (2/F)$ and is of the form:

$$(a_0 \oplus b_0 \oplus c_0)(a_1 \oplus b_1 \oplus c_1) + (a_1 \oplus b_1 \oplus c_1)(a_2 \oplus b_2 \oplus c_2) + (a_2 \oplus b_2 \oplus c_2)(a_0 \oplus b_0 \oplus c_0) \quad (20)$$

In these two latter modes of embodiment, for a line period of $(1/F)=64$ μs, the coefficients may be calculated, for example, starting from output values at the instants:

$t_0+k64$ μs, $t_0+(1/F)+k64$ μs and $t_0+(2/F)+k64$ μs for $S_0$ $t_0+(3/F)+k64$ μs, $t_0+(4/F)+k64$ μs and $t_0+(5/F)+k64$ μs for $S_1$ $t_0+(6/F)+k64$ μs, $t_0+(7/F)+k64$ μs and $t_0+(8/F)+k64$ μs for $S_2$, ... etc.

The clock frequency F which must be used in these tenth and eleventh modes of embodiment is thus equal at least to 3M times the frequency $F_2$.

Of course, in the foregoing equations (17) to (20), one is entirely at liberty to choose for outputs $a_i$, $b_j$, $c_k$ either direct outputs of the registers or, for part or the whole of these coefficients, complements to 1 of these direct outputs, complements which are equally available in the majority of practical realisations of shift registers.

In the fifth to eleventh modes of embodiment of the invention, it is desirable that the psedo-random address sequences should be as long as possible, in order to make the encoding more effective. A primary condition is to choose the lengths $n_a$, $n_b$ and $n_c$ of the registers such that the lengths of the sequences which the latter supply, respectively equal to $(2^{n_a}-1)$, $(2^{n_b}-1)$ and $(2^{n_c}-1)$, shall be the first among them. The length of the sequences of combinations of bits deriving from the three registers is then maximum and equal to the product:

$$(2^{n_a}-1)(2^{n_b}-1)(2^{n_c}-1) \qquad (9)$$

whose value is close to $2^{n_a+n_b\,30\,n_c}=2^{n_d}$.

In the fifth, sixth and seventh modes of embodiment of the invention, the coefficients of the addresses are calculated starting from M successive outputs of the registers. One could therefore find the same addresses at the outputs upon every $$\frac{(2^{n_a}-1)(2^{n_b}-1)(2^{n_c}-1)}{M} \text{ addresses}$$

if the numerator of this fraction were divisible by M. One can therefore improve the security of the system against illicit deciphering by ensuring that M is not a divisor of $(2^{n_a}-1)$ $(2^{n_b}-1)$ and $(2^{n_c}-1)$. This condition is always verified when M is equal to a power of 2 (M=4, 8, ...); it will be verified when M is divisible by 3, if $n_a$, $n_b$ and $n_c$ are not divisible by 2; it will be verified when M is divisible by 5, if $n_a$, $n_b$ and $n_c$ are not divisible by 4; it will finally be verified when M is divisible by 7, if $n_a$, $n_b$ and $n_c$ are not divisible by 3. Indeed $2^{2p}-1$ is divisible by $2^2-1=3$ $2^{2p}-1$ is divisible by $2^3-1=7$ $2^{4p}-1$ is divisible by $2^4-1=15=5\times3$ and so on.

In the eighth and ninth modes of embodiment of the invention, the same addresses could recur every $$\frac{(2^{n_a}-1)(2^{n_b}-1)(2^{n_c}-1)}{2M} \text{ addresses}$$

if the numerator were divisible by 2M. If the numerator is never divisible by 2, the conditions of maximum security are thus identical to what they are in the fifth, sixth and seventh modes of embodiment.

In the tenth and eleventh modes of embodiment of the invention, the same addresses could recur every $$\frac{(2^{n_a}-1)(2^{n_b}-1)(2^{n_c}-1)}{3M} \text{ addresses}$$

if the numerator were divisible by 3M. The conditions of maximum security thus correspond to those described in the foregoing, with the supplementary condition that the numerator shall never be divisible by 3, which amounts to requiring that $n_a$, $n_b$ and $n_c$ shall be odd.

Since it may happen that some of these conditions cannot be fulfilled, for example in the case where the number of bits of the key $n_d=n_a+n_b+n_c$ is fixed and, in particular, when this number is even, one can still make the security of the system maximum by choosing a sampling frequency F equal to the product of the frequency $F_2$ by a number which is first with $(2^{n_a}-1)$, $(2^{n_b}-1)$ and $(2^{n_c}-1)$, this number of course being equal to or greater than M, for the fifth, sixth and seventh modes of embodiment, to 2M for the eighth and ninth modes and to 3M for the tenth and eleventh modes of embodiment of the invention.

If one takes the case of the two latter modes of embodiment, with M=8 for example, the weakest frequency one may choose is:

$F=3M\cdot F_1=24\cdot F=375$ kHz.

If the length $n_d$ of the key is even, one of the registers will also have an even length and its sequence will be divisible by 3; one may then choose the frequency $F=25\cdot F_1=390.625$ kHz.

However, if one cannot avoid the length of one of the registers being divisible by 4, its sequence will be divisible by 5; one may then prefer to choose:

$F=26\cdot F_1=406.250$ kHz.

In fact, one may equally well choose a frequency which is not a multiple of $F_1$ but is equal to the product of $F_1$ by a simple fraction; the security of the system will then be maximum if the numerator of this fraction is first with $(2^{n_a}-1)$, $(2^{n_b}-1)$ and $(2^{n_c}-1)$. In the preceding example one may choose, for example, a numerator equal to the power of 2:

$F=(128/5)F_1=400$ kHz.

The period $1/F$ is then equal to 2.5 μs. To avoid ambiguities in counting the clock bits starting from the front of the synchronization line, it suffices for example to ensure a delay of the order of 0.25 μs between the front of $F_1$ and that of F for a given line. This same delay will reoccur every five lines and, for the intermediate lines, it will take one of the values 0.75, 1.25, 1.75 and 2.25 μs without ever being zero. One will then have no difficulty in counting, after each front of a synchronisation line for example, the 24 first values of the necessary outputs for calculating the eight coefficients of the addresses using equation (19) or equation (20), not using the 25th value and, for three lines in five, the 26th value of the outputs.

Finally, one may choose the fraction by which $F_1$ is multiplied to obtain F in such a way that the clock frequency F is equal to the clock frequency F' used for decoding binary audio channels, or is in a simple relationship with this frequency F'. The pseudo-random binary address generator could then be common for the deciphering of the video channel and for deciphering one or more audio channels associated with the picture.

What is claimed is:

1. A psuedo-random binary address generator for supplying addresses of cutting points of a composite video signal encoded by rotation of two segments situated on either side of each cutting point, comprising three feedback shift registers for generating polynomials which are irreducible and primitive, whereby bit sequences a, b, c which they deliver are of a maximum length, said registers having different numbers of cells $n_a$, $n_b$, $n_c$, said registers having outputs $a_i$, $b_j$ and $c_k$, said addresses of the cutting points comprising the sum of N coefficients S expressed as $$\text{sum} = \sum_{h=0}^{h=N-1} S_H 2^h$$

where N is greater than 3, at least the four of said coefficients having the greatest weight, $S_N-1$, $S_N-2$, $S_N-3$ and $S_N-4$ being derived by logic equations which consist of modulo 2 addition of said three outputs $a_i$, $b_j$ and $c_k$, denoted ($a_i \oplus b_j \oplus c_k$), and the ranks i, j and k being selected to be different by the degree $n_a$, $n_b$ and $n_c$ of the registers.

2. A pseudo-random binary address generator to deliver cutting point addresses of a composite video signal for digitally coding these video signals by rotation of the two segments situated on either side of each cutting point, comprising three feedback shift registers, each generating polynomials which are irreducible and primitive, whereby bit sequences a, b, c of a maximum length are produced, said registers having a different number of cells $n_a$, $n_b$, $n_c$, said three registers having outputs $a_i$, $b_j$ and $c_k$, and in which the addresses of the cutting points are constituted by the sum of N coefficients $S_0$ to ... $S_{N-1}$, where at least $S_N-1$, $S_N-2$, $S_N-3$ and $S_N-4$ are formed by the modulo 2 addition of said three outputs $a_i \oplus b_j \oplus c_k$, where the ranks i, j and k are selected to be different by the degrees $n_a$, $n_b$, $n_c$ of said registers.

3. An address generator as claimed in claim 1 or 2, characterized in that the numbers of the cells $n_a$, $n_b$, $n_c$ are chosen so that the lengths $(2^{n_a}-1)$, $(2^{n_b}-1)$ and $(2^{n_c}-1)$ of the sequences delivered by the registers produce a maximum length pseudo-random sequence.

4. An adder generator as claimed in claim 3, in which the logic equation of at least two of the coefficients of greatest weight comprises a logic addition of the type $a_{i'} \oplus b_{j'} \oplus c_{k'}$, the outputs $a_i a_i$, $b_j b_j$, $c_k c_k$, used for the two first coefficients and the outputs $a_{i''} b_{j''} c_{k''}$ used for the subsequent coefficients are chosen to be different by the degrees $n_a$, $n_b$, $n_c$.

5. A psuedo-random generator as claimed in claim 3 wherein the logic equations of the two coefficients of greatest weight comprise the logic addition of a product $\overline{b_j}(a_i \oplus b_{j'} \oplus c_k)$ and a product $b_j(a_{i'} \oplus b_{j'} \oplus c_{k'})$ or $b_j(a_{i'} \oplus \overline{b_{j'}} \oplus c_{k'})$ for one of these coefficients and, for the other coefficients, the logic addition of a product $\overline{c_{k''}}(a_{i''} \oplus b_{j''} \oplus c_{k''})$ and a product $c_{k''}(a_{i'''} \oplus b_{j''} \oplus c_{k''})$ or $c_{k''}(a_{i'''} \oplus b_{j''} \oplus \overline{c_{k'''}})$, and in which the logic equations of at least two of the coefficients of greatest weight that follow comprise a logic addition of the type $(a_{i'''} \oplus b_{j'''} \oplus c_{k'''})$, the outputs $a_i a_i a_{i''} a_{i'''} b_j b_{j'} b_{j''} b_{j'''} c_k c_{k'} c_{k''} c_{k'''}$, used for the two first coefficients and the outputs $a_{i'''} b_{j'''} c_{k'''}$ used for the coefficients that follow being different by the degrees $n_a$, $n_b$, $n_c$.

6. A psuedo-random generator as claimed in claim 5, wherein the maximum possible number of addresses $2^N$ is chosen equal to the first power of two less than the length of the line which comprises M samples.

7. An address generator as claimed in claim 1, wherein of the strongest of said weight coefficients comprises logic addition of two logic products, one of them being effected between an output $a_i$ or $\overline{a_i}$ of the longest register and a modulo 2 addition of the type $(a_i, \oplus b_j, \oplus c_k)$ and the other between the complementary output $\overline{a_i}$ or $a_i$ of said longest register and a modulo 2 addition of the type $(a_i, \oplus b_j, \oplus c_k)$ or of the type $(\overline{a_i}, \oplus b_j, \oplus c_k)$, and in which the logic equation of at least three of the other following coefficients of greatest weight comprise a logic addition of the type $(a_{i'}, \oplus b_{j'}, \oplus c_{k'})$, the outputs used for the first coefficients and those used for the subsequent coefficients being chosen different as far as permitted by the degrees $n_a$, $n_b$ and $n_c$.

8. A psuedo-random generator as claimed in claim 7, characterized in that the maximum possible number of addresses $2^N$ is chosen equal to the first power of two greater than the number of samples M of the line, and in which the addresses $2^p$ between $2^N-2^p$ and $2^N-1$ are reduced by a quantity $2^q$, p being chosen so that $2^N-2^p$ are less than M, and q being chosen equal to or greater than p but such that $2^q$ is less than $2^N-2^p$.

9. A pseudo-random generator as claimed in claim 8, wherein the $2^r$ addresses comprised between 0 and $2^r-1$ are increased by a quantity $2^s$, r being chosen in such a way that $2^r$ is greater than the length L of a reference segment of the signal which is not to be rotated and s being chosen at least equal to r but such that $2^s$ is less than $M-2^r$.

10. A pseudo-random generator as claimed in claim 7, wherein at regular intervals which are multiples of the frame period, a synchronization pulse from an internal clock reloads three initial words in the shift registers, said three initial words of respective lengths $n_a$, $n_b$, $n_c$ constituting the decoding key for the system.

11. A pseudo-random generator as claimed in claim 10, wherein said three initial words placed end to end constitute the $n_d = n_a + n_b + n_c$ bits of the key, said key being stored in a fourth shift register of $n_d$ stages having output to input feedback, said three registers being loaded by opening the loop or loops of said registers and connecting the inputs of the three registers to three taps on the fourth register separated respectively by a number of stages equal to $n_b$ and $n_c$, and by effecting $n_d$ clock pulses, and by subsequently disconnecting the three registers from the fourth register and reconnecting said loops.

12. A pseudo-random generator as claimed in claim 11, wherein when a new key arrives the feedback loop of the fourth register is open and its input is connected to receive the key, and $n_d$ clock pulses are supplied for transferring the $n_d$ bits of the key to the fourth register, said fourth register being subsequently disconnected from receiving the key and its loop is reconnected.

13. A pseudo-random generator as claimed in claim 1 wherein the signal to be encoded is of the time-division multiplexing type of f analog components of length $M_g$, each beginning with a reference period of length $L_g$ which is not to be rotated, independent rotations are applied to different components of the signal after each cutting in which the f addresses of the cutting points are calculated from the outputs $a_i b_j c_k$ of the three registers, and in which the logic equations chosen for determining the f addresses are independent.

14. A pseudo-random generator as claimed in claim 2, wherein the three registers each have two outputs denoted $a_0$, $a_1$, $b_0$, $b_1$, $c_0$ and $c_1$ and in which the S coefficients are formed as:

$$a_1(a_0 \oplus b_0 \oplus c_0) + \bar{a}_1(a_0 \oplus b_1 \oplus c_1)$$

or $$a_1(a_0 \oplus b_0 \oplus c_0) + \bar{a}_1(\bar{a}_0 \oplus b_1 \oplus c_1),$$

the values of the six outputs being measured at the same instant.

15. A pseudo-random generator as claimed in claim 2, wherein the first register has three outputs denoted $a_0$, $a_1$ and $a_2$, in which the second and third registers each have two outputs denoted $b_0$, $b_1$, $c_0$ and $c_1$ and in which the logic equation is of the form:

$$a_2(a_0 \oplus b_0 \oplus c_0) + \bar{a}_2(a_1 \oplus b_1 \oplus c_1)$$

the values of the seven outputs being measured at the same instant.

16. A pseudo-random generator as claimed in claim 2, wherein the three registers each have three outputs denoted $a_0$, $a_1$, $a_2$, $b_0$, $b_1$, $b_2$, $c_0$, $c_1$ and $c_2$ and in which the logic equation comprises the logic addition of the three logic products effected between two modulo 2 additions of different outputs:

$$(a_0 \oplus b_0 \oplus c_0)(a_1 \oplus b_1 \oplus c_1) + (a_1 \oplus b_1 \oplus c_1)(a_2 \oplus b_2 \oplus c_2) + (a_2 \oplus b_2 \oplus c_2)(a_0 \oplus b_0 \oplus c_0)$$

the values of the nine outputs being measured at the same instant.

17. A pseudo-random generator as claimed in claim 2 wherein the three registers have only one output, in which the clock frequency F of the registers is equal to or greater than 2M times the video signal line frequency, and in which the logic equation is a function of three outputs $a_0$, $b_0$, $c_0$ at the instant $t_0$ and of three outputs $a_1$, $b_1$, $c_1$ at the instant $t_0 + 1/F$ or $t_0 - 1/F$ and is of the form:

$$a_1(a_0 \oplus b_0 \oplus c_0) + \bar{a}_1(a_0 \oplus b_1 \oplus c_1)$$

or $$a_1(a_0 \oplus b_0 \oplus c_0) + \bar{a}_1(\bar{a}_0 \oplus b_0 \oplus c_0).$$

18. A pseudo-random generator as claimed in claim 2, wherein the first register has two outputs and the second and third registers one output, the clock frequency F of the registers being equal to or greater than 2M times the video signal line frequency, and in which the logic equation is a function of the values $a_0$, $b_0$, $c_0$ of three outputs at the instant $t_0$, of the values $a_1$, $b_1$, $c_1$ of these three same outputs at the instant $t_0 + 1/F$ and of the value $a_2$ of the second output of the first register at the instant $t_0 + 1/F$ and is of the form:

$$a_2(a_0 \oplus b_0 \oplus c_0) + a_2(a_1 \oplus b_1 \oplus c_1).$$

19. A pseudo-random generator as claimed in claim 2, wherein the three registers have only one output, in which the clock frequency F of the registers is equal to or greater than 3M times the video signal line frequency, and in which the logic equation is a function of three outputs $a_0$, $b_0$, $c_0$ at the instant $t_0$, of three outputs $a_1$, $b_1$, $c_1$ at the instant $t_0 + 1/F$ and of one output $a_2$ at the instant $t_0 + 2/F$ for $t_0 - 1/F$ and is of the form:

$$a_2(a_0 \oplus b_0 \oplus c_0) + \bar{a_2}(a_1 \oplus b_1 \oplus c_1).$$

20. A pseudo-random generator as claimed in claim 2, wherein the three registers have only one output, in which the clock frequency F of the registers is equal to or greater than 3M times the video signal line frequency, and in which the coefficients are a function of three outputs $a_0$, $b_0$, $c_0$ at the instant $t_0$, of three outputs $a_1$, $b_1$, $c_1$ at the instant $t_0 + 1/F$ and of three outputs $a_2$, $b_2$, $c_2$ at the instant $t_0 + 2/F$ and is of the form:

$$(a_0 \oplus b_0 \oplus c_0)(a_1 \oplus b_1 \oplus c_1) + (a_1 \oplus b_1 \oplus c_1)(a_2 \oplus b_2 \oplus c_2) + (a_2 \oplus b_2 \oplus c_2)(a_0 \oplus b_0 \oplus c_0).$$

21. A pseudo-random generator as claimed in claim 20, characterized in that the number M of the address coefficients is equal to a power 2.

22. A pseudo-random generator as claimed in claim 20, wherein the numbers of cells $n_a$, $n_b$ and $n_c$ are chosen to be an odd number.

23. A pseudo-random generator as claimed in claim 20, wherein the number M is divisible by 5, and the numbers of cells $n_a$, $n_b$, $n_c$ are chosen to be non-divisible by 4.

24. A pseudo-random generator as claimed in claim 20, wherein the number M is divisible by 7, and the numbers of cells $n_a$, $n_b$, $n_c$ are chosen to be non-divisible by 3.

25. A pseudo-random generator as claimed in claim 20, wherein the clock frequency is chosen equal to the product of the video signal line frequency by a number which is first with $(2^a - 1)$, $2^{nb} - 1)$ and $(2^{nc} - 1)$ or by a simple fraction whose numerator is first with $(2^{na} - 1)$, $2^n - 1)$ and $(2^{nc} - 1)$.

* * * * *

UNITED STATES PATENT AND TRADEMARK OFFICE
CERTIFICATE OF CORRECTION

PATENT NO. : 4.649.419
DATED : March 10, 1987
INVENTOR(S) : Jean-Pierre Arragon, et al It is certified that error appears in the above-identified patent and that said Letters Patent is hereby corrected as shown below:

<u>IN THE CLAIMS</u>

Claim 5. line 7  delete "$(a_{i"} \oplus b_{j"} \oplus c_{k"},)$"

insert --$(a_{i"} \oplus \bar{b}_{j"} \oplus c_{k"},)$--

Claim 25. line 6  delete "$2^n -1)$"

insert --$2^{n_b} -1$--

Signed and Sealed this

Fifteenth Day of November, 1988

Attest:

DONALD J. QUIGG

Attesting Officer  Commissioner of Patents and Trademarks